United States Patent
Perry

(10) Patent No.: US 8,518,586 B2
(45) Date of Patent: Aug. 27, 2013

(54) PREVENTING AIR INTRUSION INTO HYDROGEN-STABILIZED FUEL CELLS DURING SHUTDOWN

(76) Inventor: Michael L. Perry, Glastonbury, CT (US)

(*) Notice: Subject to any disclaimer, the term of this patent is extended or adjusted under 35 U.S.C. 154(b) by 274 days.

(21) Appl. No.: 12/998,737

(22) PCT Filed: Jan. 22, 2009

(86) PCT No.: PCT/US2009/000380
§ 371 (c)(1),
(2), (4) Date: May 25, 2011

(87) PCT Pub. No.: WO2010/085222
PCT Pub. Date: Jul. 29, 2010

(65) Prior Publication Data
US 2011/0223495 A1    Sep. 15, 2011

(51) Int. Cl.
*H01M 8/06* (2006.01)

(52) U.S. Cl.
USPC .................. 429/408; 429/415; 429/455

(58) Field of Classification Search
None
See application file for complete search history.

(56) References Cited

U.S. PATENT DOCUMENTS
5,401,589 A * 3/1995 Palmer et al. .............. 429/408

FOREIGN PATENT DOCUMENTS
WO    WO 2008027043 A1 *   3/2008

* cited by examiner

*Primary Examiner* — Barbara Gilliam
*Assistant Examiner* — Stephan Essex
(74) *Attorney, Agent, or Firm* — M. P. Williams

(57) ABSTRACT

During a process of shutting down a fuel cell power plant (11) the exits (28) of the anodes (14) are vented (76-77) under liquid (57). The liquid may be that of a coolant accumulator (57) of a fuel cell stack (12) cooled by conduction and convection of sensible heat into liquid coolant (FIG. 1) or evaporatively cooled (FIG. 4). The vent (77) may be under liquid all of the time (FIGS. 1, 3 and 4) or only after the stack has been drained of coolant (FIG. 2). The vent (77) may be the only vent for the anode exits (FIG. 3), or there may also be a purge vent valve (31) (FIGS. 1 and 4).

10 Claims, 2 Drawing Sheets

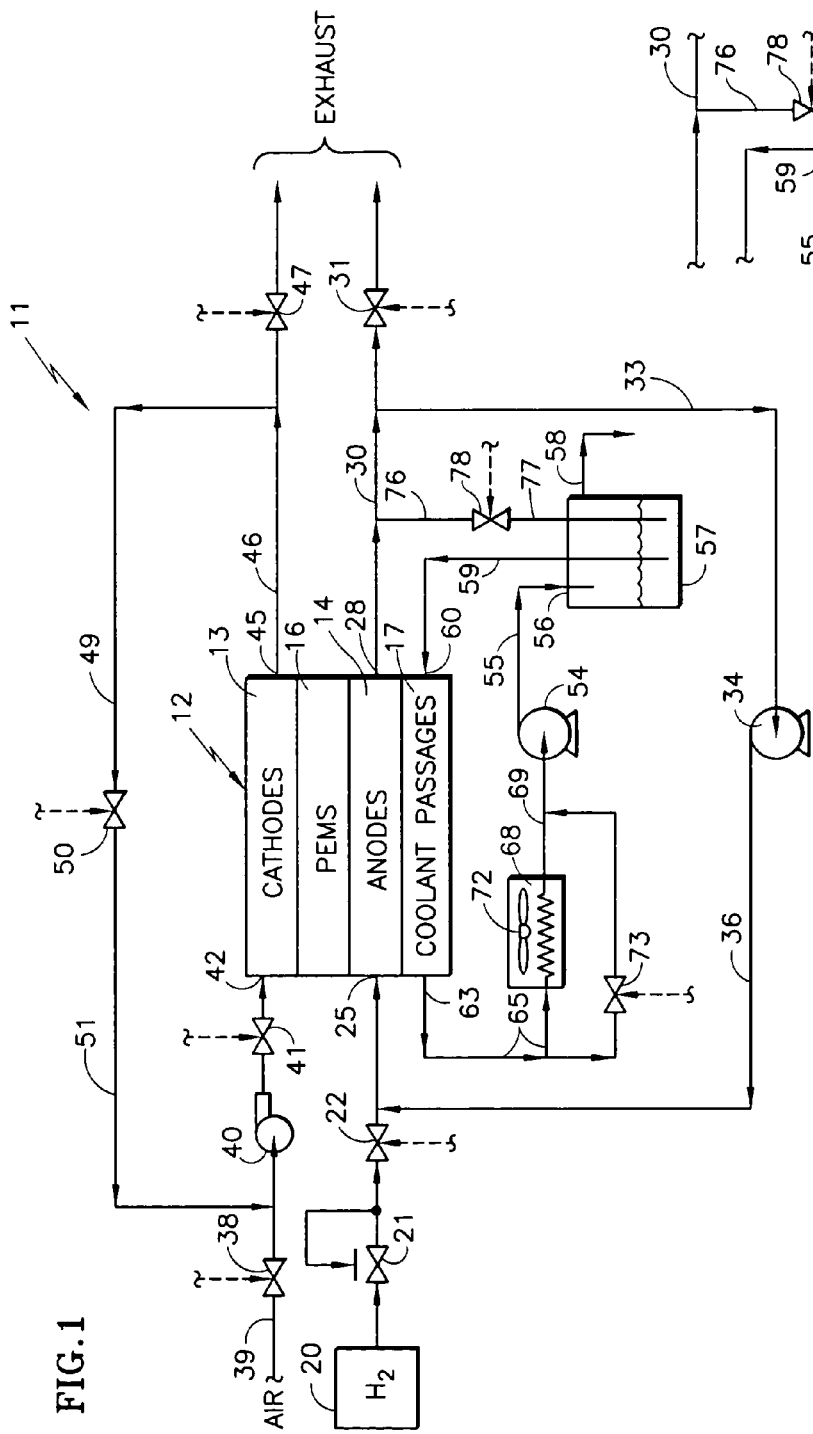

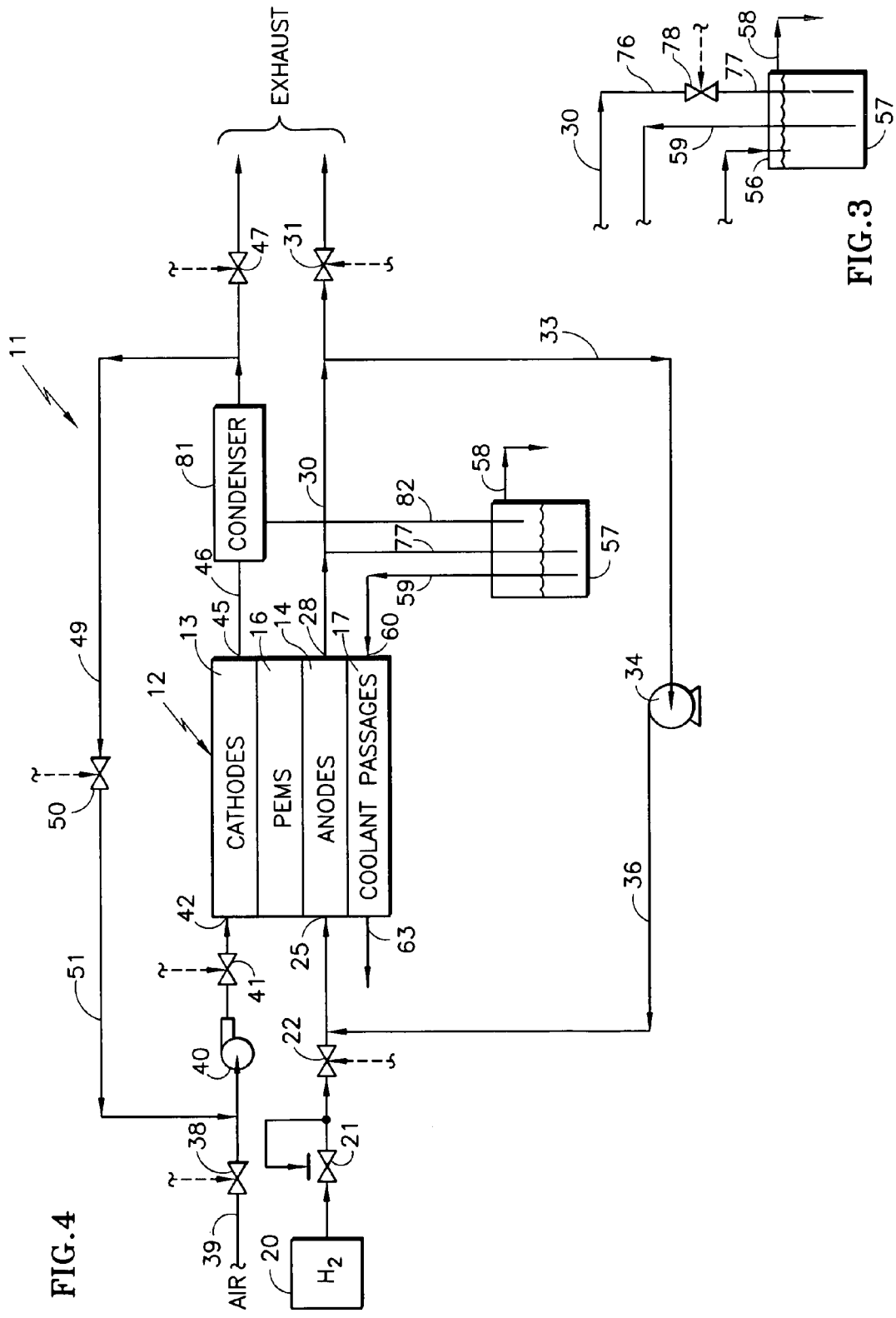

PREVENTING AIR INTRUSION INTO HYDROGEN-STABILIZED FUEL CELLS DURING SHUTDOWN

TECHNICAL FIELD

To prevent air intrusion into the stack as a result of vacuum created by reaction of hydrogen with residual oxygen and condensation of water vapor, during a fuel cell power plant shutdown procedure, the anode exhaust is vented in water.

BACKGROUND ART

Degradation of a fuel cell stack results from oxidation of catalyst support materials which reduces fuel cell stack performance and shortens the life of the fuel cell stack. High temperatures and high potentials in the fuel cells exacerbate the degradation. A known method to reduce the time that the cells are at high potentials and high temperatures is to remove the oxygen from the air side volume of the fuel cell stack (including the oxidant flow fields in the cells, inlet and exit manifolds, plumbing, etc.), and to stabilize hydrogen levels in both the cathode and anode flow fields, which prevents high voltages in the cells. The hydrogen stabilization process is sometimes referred to as "hydrogen on".

Typical hydrogen stabilization is accomplished in a shutdown procedure which includes (a) blocking the input of fresh air into the stack, (b) removing the service load and connecting the stack to a resistive auxiliary load, (c) performing cathode recycle by conducting cathode exhaust to the inlet of the cathode blower, which remains on, while continuing to provide fresh hydrogen to the cells, with fuel recycle on, and with fuel purge blocked; this stage of the procedure continues until sufficient hydrogen has been provided to react with all of the residual oxygen in the air-side volume, (d) closing off the inlet of fresh hydrogen to the fuel cells while continuing to provide cathode and fuel recycling.

After the supply of fresh hydrogen has been isolated from the system, the consumption of residual oxygen with hydrogen and condensation of water vapor, due to cooling of the system, creates a vacuum which, if not otherwise relieved, causes air to be sucked into the stack from wherever there are leak paths in the system. To relieve this vacuum in a controlled manner, it is known to vent the anode and/or the cathode to ambient, at least a small amount. In the case of the cathode, any gas flow through its exhaust system will present unwanted oxygen to the fuel cells. In the case of the anode, the small amount of suction may only result in drawing some of the previously expelled anode exhaust, consisting mainly of hydrogen and nitrogen, back into the cells, which would be harmless. But if the suction is too large, then air will follow the previous anode exhaust into the fuel cells and exacerbate the problem of oxygen causing high voltages and oxidation of the catalyst support material.

SUMMARY

Intrusion of air into fuel cells of a stack during a shutdown procedure is avoided by venting the anodes into water. Thus, if a sufficiently strong reduction of pressure occurs during the hydrogen stabilization process, first hydrogen exhaust and then water, but no air, will enter the fuel cells. Small amounts of water in the anodes, even if frozen, will not prevent future startup of the fuel cell's power plant, so long as sufficient fuel can pass through the water or ice to the anode catalyst layer. Once operational, anodes will clear water during the fuel cell electrochemical process.

Other variations will become more apparent in the light of the following detailed description of exemplary embodiments, as illustrated in the accompanying drawings.

BRIEF DESCRIPTION OF THE DRAWINGS

FIG. 1 is a simplified schematic diagram of a fuel cell power plant cooled by conduction of sensible heat into flowing coolant water and having an anode vent continuously immersed in water.

FIG. 2 is a fractional schematic diagram illustrating a variation of the fuel cell power plant of FIG. 1 in which the anode vent is immersed in water only after the fuel cell stack has been drained.

FIG. 3 is a fragmentary schematic diagram of a modification of the fuel cell power plant of FIG. 1 in which venting of the anodes is exclusively through a vent immersed in water.

FIG. 4 is a schematic diagram of a fuel cell power plant cooled by evaporation and having an anode vent immersed in water.

MODES(S) OF IMPLEMENTATION

Referring to FIG. 1, a fuel cell power plant 11 includes a stack of fuel cells 12 each fuel cell having a cathode 13 and an anode 14 with a proton exchange membrane electrode 16 between them. In an exemplary embodiment, the reactant gas flow fields (well known and not shown) are disposed in bipolar plates, at least one of which has coolant passages 17 on a side of the plate opposite to the side having reactant gas flow field channels. These bipolar plates can either be solid or micro-porous, hydrophilic water transport plates, both of which are well known. There may or may not be cooler plates interspersed or at intervals between bipolar plates.

Fuel is provided from a source 20 of hydrogen, through a pressure control valve 21, and a fuel flow control valve 22 to inlets 25 of the anodes. The exits 28 of the flow fields transfer hydrogen-depleted exhaust through a conduit 30 that leads to a remotely controllable purge valve 31. The purge valve 31 may be slightly opened continuously, or operated periodically on a pulse-width modulation basis, as necessary to eliminate contaminants and inerts such as nitrogen. A conduit 33 connects the anode exhaust to an anode recycle pump 34, the output of which in a conduit 36 is connected with the inlets 25 of the anodes.

Air is provided in a conduit 39 through an air inlet valve 38 to an air blower 40, which provides air through an air control valve 41 to inlets 42 of the cathodes 13. The cathode exits 45 are connected through a conduit 46 and a valve 47 to exhaust, which may comprise a mix box where exhausted process air is mixed with exhausted fuel so as to reduce flammability before discharging to the atmosphere.

To perform hydrogen stabilization in the anodes and cathodes at shutdown, cathode recycle is provided in this embodiment by a conduit 49 which is connected through a remotely operable feedback valve 50 and a conduit 51 to the inlet of the air blower 40.

Coolant liquid is drawn through the coolant passages 17 by a coolant pump 54 which provides the coolant over a conduit 55 to an inlet 56 of an accumulator 57. An air vent 58 can also serve as an overflow release. Coolant is drawn from the accumulator 57 through a coolant-inlet conduit 59 to coolant inlets 60 of the coolant passages 17. The exits 63 of the coolant passages provide coolant over a conduit 65 through a heat exchanger 68 where the coolant is cooled. The heat exchanger is connected by a conduit 69 to the pump 54. The coolant temperature may be regulated by controlling the speed of a fan 72 in the heat exchanger 68, or by a controllable bypass valve 73, which passes some of the coolant around the heat exchanger, thus reducing its effectiveness. Although not shown, a deionizer (also known as a demineralizer) may be interposed in the conduit 69 before the inlet to the pump 54.

To prevent intrusion of air during hydrogen stabilization of a shutdown procedure, and during the period of shutdown, the anode exhaust is vented into a liquid reservoir, such as in the accumulator 57, by means of conduits 76 and 77 and a controllable valve 78.

During the shutdown procedure, described hereinbefore, (a) the service load is removed and a resistive auxiliary load is connected to the stack, (b) fresh air input is blocked by closing the valve 38, (c) cathode recycle is enabled by opening the valve 50, (d) while hydrogen is continued to be supplied to the anodes 14, with the fuel recycle pump 34 on. As the hydrogen reacts with oxygen, the conversion of hydrogen and oxygen gas to water reduces the pressure in the anode and cathodes. Additionally, water vapor inside this isolated gas volume condenses as the system cools down. In order to prevent a strong vacuum from forming and air intruding from uncontrolled locations, the valves 31 and 47 may be closed and the valve 78 opened, so that any negative pressure will be relieved by withdrawing gas from the conduits 76 and 77. Because this gas is hydrogen, it will not affect the process; but if the pressure reduction is too great, then a small amount of liquid will be drawn up into the conduits 76 and 77 from the accumulator 57. If the pressure reduction is really large, then the liquid may even be drawn up all the way into the anodes 14; which is acceptable if the coolant liquid is benign to the stack, such as water. If the coolant is potentially harmful to the stack, such as an anti-freeze like ethylene glycol, then the system should be designed to prevent intrusion of the coolant into the anodes. This is in contrast to the prior art where the valve 31 would be open, at least partially, to avoid a high suction in the anodes and cathodes. In this manner, the possibility of the infusion of air through the valve 31 and conduit 30 is avoided. This greatly reduces the opportunity for corrosion of the catalyst supporting materials in the fuel cells, thereby improving performance and increasing the lifetime of the fuel cell stack 12.

In an alternative embodiment illustrated in FIG. 2, the conduit 77 may be sufficiently short so that it will be vented underwater only when the stack has been shut down and the coolant drained back to the accumulator 57 (as shown in FIG. 2). In such a case, the stack must be drained of coolant before hydrogen stabilization. This differs from the embodiment in FIG. 1 wherein the conduit 77 is sufficiently long so as to reach a lower level of coolant when the fuel cell is operating normally.

In another embodiment, the purge valve 31 (FIG. 1) may be eliminated, with purge being accomplished through the valve 78 as shown in FIG. 3, either constantly venting a small amount of anode exhaust, or by venting with pulse-width modulation. During a shutdown procedure, the valve 78 would remain open to assure that no significant air intrusion occurs as a result of a process-created vacuum in the fuel cells. In this embodiment, the conduit 77 may be sufficiently short so that it will be vented underwater only when the stack has been shut down and the coolant drained back to the accumulator 57 (as shown in FIG. 2), or the conduit 77 can be sufficiently long so as to reach a lower level of coolant when the fuel cell is operating normally (as shown in FIG. 1) since some back pressure on the anode exhaust is typically desirable.

The embodiment illustrated in FIG. 1 is implemented in a fuel cell power plant in which the stack is cooled by conduction and convection of sensible heat into circulating coolant. However, air intrusion during shutdown procedures can also be prevented in fuel cell stacks employing evaporative cooling, of the type shown in Patent Publication US2006/0131330-A1, as illustrated in FIG. 4. The condensate of a condenser 81 is returned to the accumulator through a conduit 82. The cathode recycle conduit 49 is connected downstream of the condenser 81 so as to return dry cathode exhaust to the air blower 40 during the shutdown procedure. This type of cooling is especially effective with stacks that employ microporous, hydrophilic water transport plates since the water required to provide evaporative cooling is provided throughout the stack, as needed, from the coolant passages. However, evaporative cooling can also be done by spraying water into the anode and/or the cathode inlets, as is known (and not depicted here). The amount of coolant liquid involved in an evaporatively-cooled fuel cell stack is much less than that in a stack that conducts sensible heat into the coolant water. The anode vent conduit 77 will therefore extend to nearly the bottom of the accumulator 57 in such case. The condenser and anode exhaust can be arranged so that the anode vent conduit 77 will be disposed in the condenser condensate reservoir, which would also serve as accumulator.

The venting of anodes into liquid may be practiced in systems without cathode recycle and with respect to shutdown procedures which vary from that described hereinbefore.

The invention claimed is:

1. A method comprising:
   (a) stabilizing hydrogen in the anodes (17) and cathodes (13) of a stack (12) of fuel cells by providing hydrogen to inlets (25) of the fuel cell anodes (14) while supply of fresh air to the inlets (42) of the cathodes (12) is blocked by the closure an air inlet valve (38);
   characterized by:
   (b) venting (30, 76-77) exits (28) of the anodes into liquid of an accumulator (57).

2. A method according to claim 1 further characterized by step (a) including recycling (46, 49-51) cathode exhaust from exits (45) of the cathodes to the inlet of an air blower (40) connected to inlets (42) of the cathodes.

3. A method according to claim 1 further characterized in that said steps (a) and (b) are performed while fuel is being recycled from the anode exits (60) to the anode inlets (25).

4. A method according to claim 1 further characterized in that said steps (a) and (b) are performed while a fuel purge valve (31) is closed.

5. A method according to claim 1 further characterized in that said steps (a) and (b) are performed while a cathode exhaust valve (47) is closed.

6. A fuel cell power plant (11) comprising:
   a stack (12) of fuel cells, each fuel cell having fuel reactant gas flow fields (14) with inlets (25) and outlets (28);
   characterized by:
   said outlets (28) being vented into liquid of an accumulator (57).

7. A fuel cell power plant according to claim 6 further characterized in that said outlets (28) are vented by a conduit (76, 77) which extends only part way (FIG. 2) into the accumulator (57) so that they are vented into liquid of the accumulator (57) only when coolant in the fuel cells of the stack has been drained into the accumulator.

8. A fuel cell power plant (11) according to claim 6 further characterized in that said outlets (28) are vented by a conduit (76, 77) which extends to the bottom (FIGS. 1, 3 and 4) of the accumulator (57) so that they are vented into liquid of the accumulator (57) at all times.

9. A fuel cell power plant (11) according to claim 6 further characterized in that said outlets (28) are also selectively vented through a purge valve (31).

10. A fuel cell power plant (11) according to claim 6 further characterized in that said outlets (28) are vented into liquid of the accumulator (57) through conduits (76, 77) having a flow control valve (78) disposed between them.

\* \* \* \* \*